US008753236B2

(12) United States Patent     (10) Patent No.: US 8,753,236 B2
Wong et al.     (45) Date of Patent: Jun. 17, 2014

(54) SYNCHRONIZED SEGMENTALLY INTERCHANGING PULLEY TRANSMISSION SYSTEM

(75) Inventors: Anthony Wong, Scarborough (CA); Paul Boterro, Toronto (CA); Michael Doyle, Toronto (CA)

(73) Assignee: 1783590 Ontario Ltd., Toronto (CA)

( * ) Notice: Subject to any disclaimer, the term of this patent is extended or adjusted under 35 U.S.C. 154(b) by 2169 days.

(21) Appl. No.: 12/676,894

(22) PCT Filed: May 19, 2005

(86) PCT No.: PCT/CA2005/000759
§ 371 (c)(1),
(2), (4) Date: Nov. 12, 2010

(87) PCT Pub. No.: WO2005/111463
PCT Pub. Date: Nov. 24, 2005

(65) Prior Publication Data
US 2011/0045928 A1     Feb. 24, 2011

Related U.S. Application Data

(60) Provisional application No. 60/572,075, filed on May 19, 2004.

(51) Int. Cl.
*F16H 55/00* (2006.01)

(52) U.S. Cl.
USPC .......................................................... 474/47

(58) Field of Classification Search
USPC .......................................... 474/24, 47, 49, 53
See application file for complete search history.

(56) References Cited

U.S. PATENT DOCUMENTS 999,530 A * 8/1911 Staff et al. .......................... 474/53
1,044,535 A * 11/1912 Kent et al. ........................ 474/47

(Continued)

FOREIGN PATENT DOCUMENTS

DE     817 985     10/1951

OTHER PUBLICATIONS

The PCT International Search Report dated Oct. 18, 2005 for PCT Int'l Appln. No. PCT/CA2005/000759, filed May 19, 2005 (2 pgs.).

*Primary Examiner* — William A Rivera
*Assistant Examiner* — Henry Liu
(74) *Attorney, Agent, or Firm* — Tarolli, Sundheim, Covell & Tummino LLP

(57) ABSTRACT

A segmented pulley transmission [20] is provided. A pulley assembly [36] is rotationally mounted on an axle [32]. The pulley assembly [36] includes a core pulley [45] having a first set of mating features on a peripheral surface thereof. A pulley segment set comprises a number of pulley segments [48] slidably mounted in the pulley assembly and arranged in a ring concentric with the core pulley [45]. The pulley segments [48] are individually actuatable out of the pulley assembly into an engaging position and into the pulley assembly into a non-engaging position. The pulley segments [48] have a second set of mating features [52] on an peripheral surface matching the first set of mating features. An endless drive member [47] has corresponding mating features on an inside surface for engaging the first and second sets of mating features of the core pulley [45] and the pulley segments [48] in an engaging position. Contact between the endless drive member [47] and a core pulley defines a contact zone [CZ]. An actuator [80] actuates the pulley segments [48] between the engaging and non-engaging positions when the pulley segments [48] are outside of the contact zone [CZ]. One of the pulley segments [48] in the pulley segment set is a key pulley segment [48a] that is positioned relative to the care pulley [45] such that when the key pulley segment [48a] is actuated to the engaging position and rotated into the contact zone [CZ], the corresponding mating features of the endless drive member [47] engage the first set of mating features of the core pulley [45] and the second set of mating features [52] of the key pulley segment [48a] without the introduction of significant slack or tension.

39 Claims, 4 Drawing Sheets

(56) References Cited

U.S. PATENT DOCUMENTS

| | | | | |
|---|---|---|---|---|
| 1,428,999 A * | 9/1922 | Tygard et al. | | 474/47 |
| 1,523,241 A * | 1/1925 | Backman | | 474/53 |
| 1,662,037 A * | 3/1928 | Wichtendahl | | 474/53 |
| 2,455,483 A * | 12/1948 | Harry | | 474/53 |
| 2,702,484 A * | 2/1955 | Arata | | 474/24 |
| 2,827,795 A * | 3/1958 | Caballeros M. | | 474/9 |
| 3,604,282 A * | 9/1971 | Shambaugh et al. | | 474/47 |
| 3,861,227 A * | 1/1975 | Hunt | | 474/47 |
| 4,024,772 A * | 5/1977 | Kumm | | 474/51 |
| 4,453,923 A * | 6/1984 | Cole, Jr. | | 474/47 |
| 4,457,739 A * | 7/1984 | Iseman | | 474/49 |
| 4,913,685 A * | 4/1990 | Lukatsch | | 474/49 |
| 5,049,113 A * | 9/1991 | Graham, Jr. | | 474/49 |
| 5,116,282 A * | 5/1992 | Graham | | 474/49 |
| 5,443,423 A * | 8/1995 | Ha | | 474/47 |
| 5,468,191 A * | 11/1995 | Monahan | | 474/8 |
| 5,637,046 A * | 6/1997 | Ha | | 474/53 |
| 6,267,699 B1 * | 7/2001 | Gruich et al. | | 474/49 |
| 6,749,531 B2 * | 6/2004 | Kang | | 474/160 |
| 7,713,153 B2 * | 5/2010 | Naude | | 474/49 |
| 7,951,027 B2 * | 5/2011 | An | | 474/47 |
| 2009/0118043 A1 * | 5/2009 | Eitan et al. | | 474/56 |

* cited by examiner

SYNCHRONIZED SEGMENTALLY INTERCHANGING PULLEY TRANSMISSION SYSTEM

CROSS-REFERENCE TO RELATED APPLICATIONS

This application claims the benefit of U.S. Provisional Patent Application No. 60/572,075 filed May 19, 2004 and entitled SYNCHRONIZED SEGMENTALLY INTERCHANGING PULLEY TRANSMISSION SYSTEM.

FIELD OF THE INVENTION

The present invention relates to transmission systems, and more particularly to multi-ratio transmissions.

BACKGROUND OF THE INVENTION

There have been numerous attempts to develop a multi-ratio transmission capable of shifting under load over the past century. Potential applications for such a transmission system are numerous, including motor vehicles, human-powered vehicles, maritime craft, and even turbines for power generation.

U.S. Pat. No. 1,428,999 to Tygard discloses a transmission system with axially-engaging, concentric nestable rims for varying a drive pulley diameter. U.S. Pat. No. 2,827,795 to Caballeros discloses a similar design utilizing a conical-shaped array of pulley segments. U.S. Pat. Nos. 5,443,423 and 5,637,046, both to Ha, and U.S. Pat. No. 6,267,699 to Gruich disclose transmission mechanisms specifically designed for automotive and bicycle applications, respectively. Other technical approaches to the development of multi-ratio transmissions abound. The most common feature either two pulleys connected by an endless flexible member, with radially-moving members that vary the diameter of one or more pulleys; or pulleys comprised of opposing conical sheave halves between which the endless drive member is tensioned and compressed, to produce continuously variable ratio of power transmission by moving the opposing sheave halves axially in order to control the radius around which the endless drive member rides. Other manifestations utilize conical components with enhancements.

Certain mechanical problems persistently affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such systems by decreasing their reliability, increasing wear, etc.

Accordingly, there is a need for a novel multi-ratio transmission.

SUMMARY OF THE INVENTION

In an aspect of the invention, there is provided a segmented pulley transmission, comprising:

a pulley assembly rotationally mounted on an axle, said pulley assembly including a core pulley having a first set of mating features on a peripheral surface thereof;

a pulley segment set comprising a number of pulley segments slidably mounted in said pulley assembly and arranged in a ring concentric with said core pulley, said pulley segments being individually actuatable out of said pulley assembly into an engaging position and into said pulley assembly into a non-engaging position, and having a second set of mating features on a peripheral surface matching said first set of mating features, an endless drive member having corresponding mating features on an inside surface for engaging said first and second sets of mating features of said core pulley and said pulley segments in an engaging position, wherein contact between said endless drive member and a core pulley defines a contact zone;

an actuator for actuating said pulley segments between said engaging and non-engaging positions when said pulley segments are outside of said contact zone;

wherein one of said key pulley segments in said pulley segment set is a key pulley segment that is positioned relative to said core pulley such that when said key pulley segment is actuated to said engaging position and rotated into said contact zone, said corresponding mating features of said endless drive member engage said first set of mating features of said core pulley and said second set of mating features of said key pulley segment without the introduction of significant slack or interference in the endless member between the point of engagement with the pulley segment and the point of engagement with the core pulley.

In accordance with another aspect of the present invention, there is provided a segmented pulley transmission, comprising:

a pulley assembly rotationally mounted on an axle, said pulley assembly including a core pulley having a first set of mating features on a peripheral surface thereof, said pulley assembly also including a first carousel and a second carousel separated by said core pulley;

a pulley segment set comprising a first pulley segment subset slidably mounted in said first carousel and a second pulley segment subset slidably mounted in said second carousel, said first and second pulley segment subsets being arranged in a ring concentric with said core pulley, said pulley segments of said first pulley segment subset being individually actuatable out of said first carousel and towards said second carousel, said pulley segments of said second pulley segment subset being individually actuatable out of said second carousel and towards said first carousel, said pulley segments of said first and second pulley segment subsets being positioned to interleave and provide a virtual pulley larger than said core pulley.

One feature of the present invention is the synchronization methodology. Some pulley segments are engineered to be, and are designated as, key pulley segments that enable the engagement of the endless drive member simultaneously with co-aligned pulley segments in multiple pulley segment sets of different radii during the transition from one pulley segment set to another. By virtue of utilizing key pulley segments to precisely engage the endless drive member with pulley segments in rapid sequence, the present invention has overcome the significant limitation related to high-speed ratio variation under significant load.

The present invention can provide a plurality of gear ratios in an efficient manner. Since no clutch is necessary for transitioning between pulley segment sets, there is no mandatory pause in the transmission of force. In addition, since there is a reduced penalty in changing ratios, their range can be expanded, particularly toward the lower ratios presented to an engine in a vehicle. This benefit could enhance acceleration, making smaller, efficient engines more suitable for many applications, and moreover would increase the acceleration of performance-oriented vehicles.

These and other features, advantages and objects of the present invention will be further understood and appreciated by those skilled in the art by reference to the following specification, claims and appended drawings.

BRIEF DESCRIPTION OF THE DRAWINGS

In order that the present invention may be readily understood, one embodiment of the invention is illustrated by way of example in the accompanying drawings.

Further details of the invention and its advantages will be apparent from the detailed description hereinafter provided.

DETAILED DESCRIPTION OF THE EMBODIMENTS

The present invention operates as part of a power transmission that changes ratio under load, and involves a plurality of pulleys, divided into segments, which segments move in channels or on rails along the rotational axis, into and out of the path of a toothed belt or chain. In this transmission system, as segments of a plurality of toothed, concentric and coaxial pulleys move axially, along channels or rails, into and out of the path of a toothed belt or chain, from either side of the belt or chain, pulley segment movement is coordinated by a synchronization and timing system, and the coordinated movement of pulley segments allows the belt or chain to change engagement between a plurality of concentric pulleys, without disrupting their rotation or the delivery of power through the belt or chain. This is accomplished by enabling the teeth of the belt to be continuously engaged by at least one toothed pulley, and at some points—when the belt is changing engagement between pulleys—engaged by both the engaging and disengaging pulleys, in transition. The toothed belt may be delivering power to, or receiving power from, a regular pulley, or a replica instance of the present invention.

Figure 1:
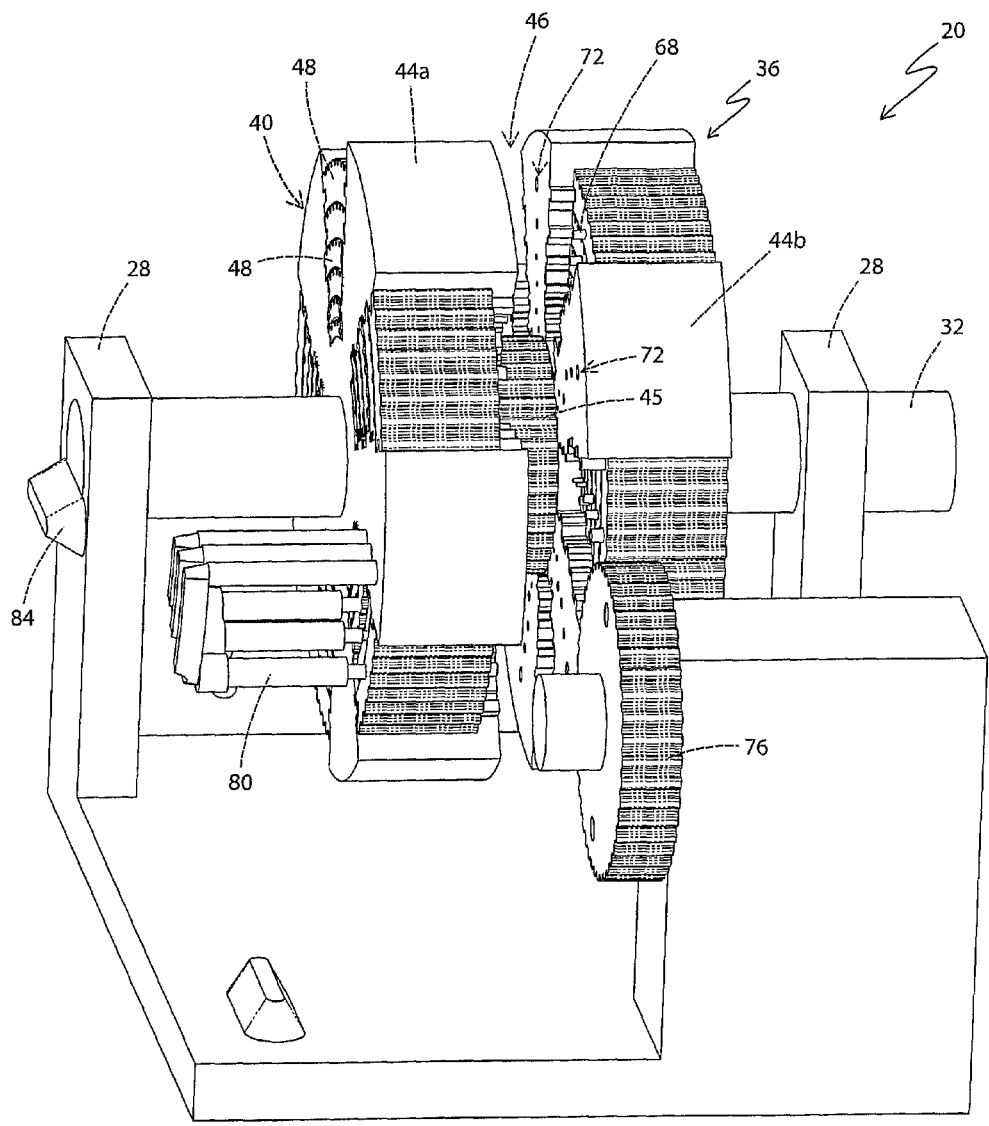
FIG. 1 shows a perspective view of a portion of the pulley assembly.
Figure 2:
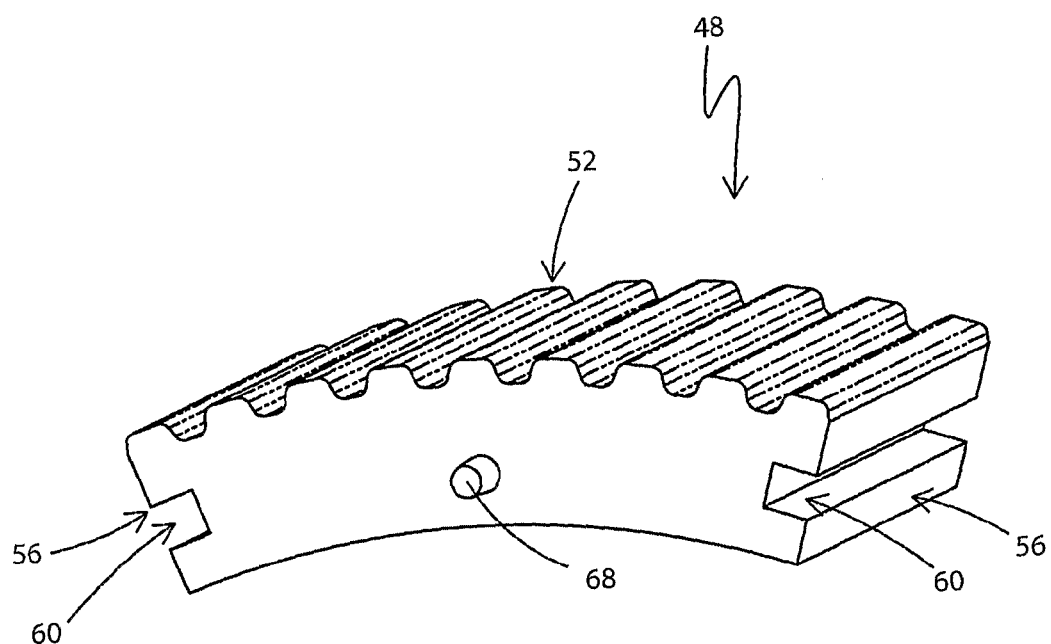
FIG. 2 shows a perspective view of a pulley segment.
Figure 3:
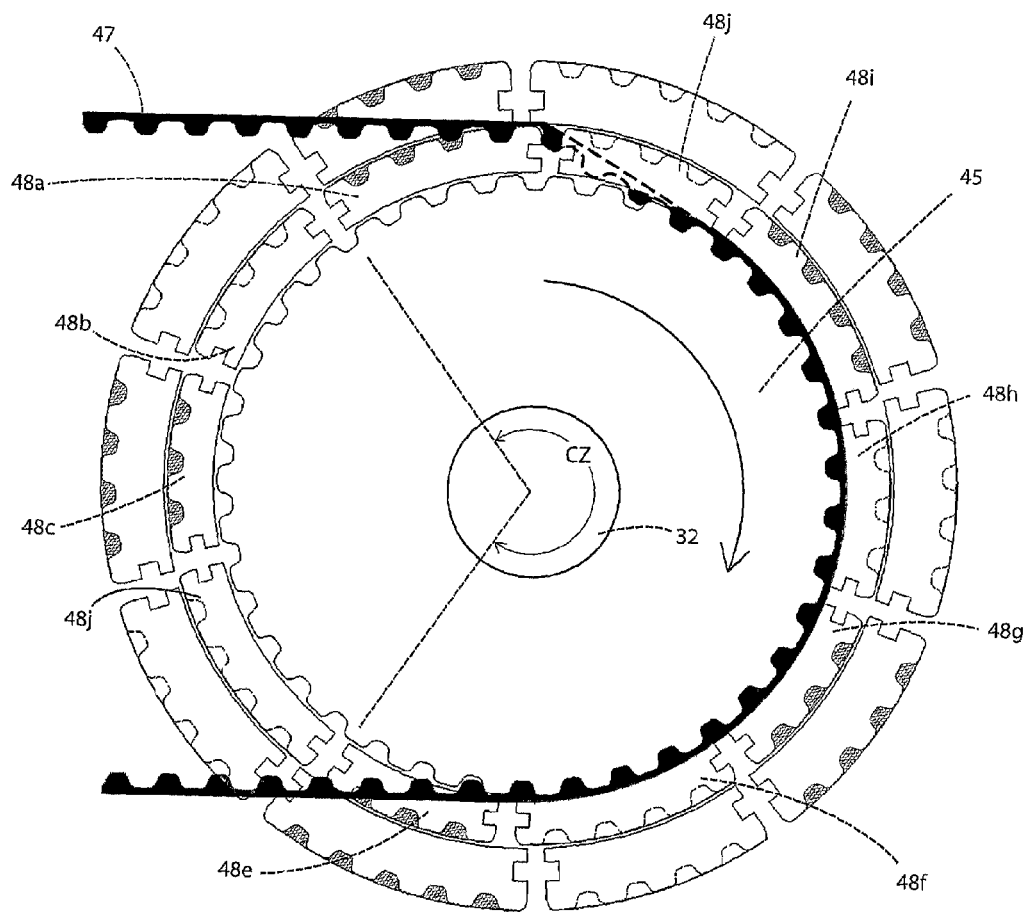
FIG. 3 shows a side sectional view of a core pulley and pulley segment sets.

FIGS. 1 to 3 show a pulley transmission 20 in accordance with an embodiment of the present invention. The pulley transmission 20 has a pulley housing 24 having a pair of support brackets 28. An axle 32 is rotatably mounted on the support brackets 28. A pulley assembly 36 is fixedly mounted on the axle 32. The pulley assembly 36 has a pulley assembly frame 40 that, in turn, has two carousels 44a, 44b that are spanned by a core pulley 45. The core pulley has mating features on a peripheral surface thereof; namely, teeth. The carousels 44a, 44b are spaced from one another to provide a circumferential channel 46 therebetween and around the pulley assembly 36 through which an endless drive member 47 can travel. The carousels 44a, 44b have a number of pulley segments 48 that are arranged in concentric circles around the axle 32. The pulley segments 48 are mounted in the carousels 44a, 44b such that they are able to slide in a direction axial to the axle 32. In particular, the pulley segments 48 mounted in carousel 44a operably slide toward carousel 44b. Correspondingly, the pulley segments 48 mounted in carousel 44b operably slide toward carousel 44a. The pulley segments 48 of the carousels 44a, 44b are alternatingly angularly offset such that they interleave when urged towards each other.

The pulley segments 48 are shown arranged in concentric circles on both carousels 44a, 44b. Collectively, the pulley segments 48 of corresponding concentric circles of each carousel 44a, 44b form pulley segment sets. In total, the pulley assembly 36 has a total of six pulley segment sets, of which the four innermost sets are shown biased out of the carousels 44a, 44b to form a virtual pulley. Each pulley segment set is formed of two pulley segment subsets, one of the subsets being mounted in carousel 44a and the other of the subsets being mounted in carousel 44b.

Pulley segments 48 in a pulley segment set are arrayed alternately from either side of the channel through which the endless drive member 47 travels, such that pulley segments can be supported in close proximity to pulley segments in the next larger or smaller pulley segment set without supporting material or structure of the carousels 44a, 44b therebetween, using holding and guiding rails or channels that are arrayed proximate to radii such that they form strong radial struts that hold and guide pulley segments between rails or channels on opposing facets.

Pulley segment sets in the pulley assembly feature pulley segments held in one of two positions: in the "engaging position", where pulley segments are axially aligned with the endless drive member and may engage the endless drive member, or in the "non-engaging position", where pulley segments are axially positioned away from the path of the endless drive member and thus will not engage the endless drive member.

Each of the pulley segments 48 in carousel 44a have a stud 68 that is dimensioned to be securely received by a corresponding aperture 72 in the opposing carousel 44b. Correspondingly, each of the pulley segments 48 in carousel 44b have a stud 68 that is dimensioned to be securely received by a corresponding aperture 72 in the opposing carousel 44a.

A cooperating pulley 76 is rotatably mounted onto the housing 24 and has a number of teeth around an outer periphery. The shape and "pitch" of the teeth on the outer periphery of the cooperating pulley 76 match those of the pulley segments 48.

An actuator 80 is coupled to each pulley segment 48 and the pulley assembly frame 40. The actuators 80 pneumatically move the pulley segments 48 towards and away from the opposing carousel.

A sensor 84 is secured to the housing 24 and operable to detect the rotational position, direction, and speed of the pulley assembly 36. The sensor 84 transmits position and speed information to a sequencer 88. The sequencer 88 is also in communication with the actuators 80 and controls the actuators 80.

An idler pulley and tensioner (not shown) are located adjacent the pulley assembly. The idler pulley is a freely rotating pulley on bearings or bushings which is mounted on a tensioner. The purpose of the idler pulley is to tension the slack portion of the endless drive member, and to keep the endless drive member from ratcheting, slipping or otherwise interfering with any pulley segment.

The pulley assembly rotates freely on an axis in the housing via bushings or bearings. Power is transmitted to or from the present invention through the rotation of the pulley assembly, potentially via the axle or a gear or pulley integrated into the pulley assembly.

Referring to FIG. 2, a pulley segment 48 is shown having features mating with features of the endless drive member 47 in the form of a toothed surface 52, and two lateral facets 56. The shape of the teeth and the spacing between teeth, or "pitch", on the toothed surface 52 is common to each of the pulley segments 48 and corresponds to the teeth and pitch of the endless drive member 47. Each lateral facet 56 has a channel 60 that receives a mating rail feature of the carousels 44a, 44b and allows the pulley segment 48 to slide axially into and out of the carousels 44a, 44b.

The pulley segments 48 each have teeth on their toothed surface 52 for engaging the endless drive member 47, and also have channels 60 on their facets 56 that mate with corresponding rails on the carousels 44a, 44b to guide their axial motion. These rails may be lubricated or fitted with bearings or bushings to reduce friction. The pulley segments combine in a plurality of sets, with each set being a ring of concentric pulley segments, together functioning as a whole pulley. The pulley segments 48 have features for functioning with the actuators such that the actuators can move each from its engaging position to its non-engaging position.

One or more pulley segments 48 designated as "key" pulley segments are the initial pulley segments involved in the transition from a smaller pulley segment set to a larger pulley segment set and the last pulley segments involved in the transition from a larger pulley segment set to a smaller pulley segment set. Key pulley segments are defined by their angular relationship with one or more smaller pulley segment sets. In particular, when a key pulley segment is moved into an engaging position, the circumferential position of the key pulley segment allows it to engage the endless drive member 47 while the endless drive member 47 is still engaging the smaller pulley segment set without introducing significant interference or slack to the endless drive member 47. This is achieved by design, placing the key pulley segment at a position where no significant interference or slack is introduced when the teeth of the endless drive member engage the teeth of the key pulley segment and the teeth of the adjacent pulley segment of the smaller pulley segment set. That is, the distance between teeth of the key pulley segment and the smaller pulley segment set as spanned by the endless drive member 47 is generally equal to a multiple of the equal spacing between the teeth of the endless drive member 47.

Pulley segments 48 of each pulley set are alternately arrayed on each side of the pulley assembly, in a pattern that provides the pulley assembly with increased strength. Thus, when the pulley segments 48 of a concentric pulley segment set are actuated into their engaging positions, the pulley segments 48 interleave from carousel 44A and carousel 44B to form a virtual pulley. The pulley segments rest in their non-engaging position in an arrangement on either side of the path of the endless drive member.

This design allows for pulley segments 48 to be held and guided with rails or channels along their facets 56, so that the radial distance between the pulley segment sets may be decreased with no guiding or supporting structure between the facets 52 of the pulley segments 48 which may nest the pulley segment sets in closer proximity to each other.

FIG. 3 shows a cross-sectional view of the core pulley 45 and two pulley segment sets immediately surrounding the core pulley 45. An endless drive member 47 is shown engaging the core pulley 45 and pulley segment 48. The endless drive member 47 is a belt that has engaging features along its inner circumference. In particular, the engaging features are teeth that generally mate with the teeth of the pulley segments 48.

The endless drive member 47 engages the pulley segments 48 in one or more pulley segment sets and engages the cooperating pulley 76 simultaneously.

Each pulley segment 48 is individually moved by an actuator 80, in an axial direction from its non-engaging position to its engaging position and from its engaging position to its non-engaging position, as controlled by the sequencer 88.

Sequencing and synchronization of pulley segment movement is accomplished either mechanically, or via an electronic or computerized system of sensors and actuators. The purpose of the sequencer is to control the actuation of the pulley segments, and primarily the ordered movement of each pulley segment from an engaging position to a non-engaging position, and additionally to ensure that the pulley segments stay in their engaging or non-engaging position, as appropriate. The sequencer 88 ensures that the appropriate pulley segments move from their engaging position to their non-engaging position or from their non-engaging position to their engaging position in the order and timing that is optimal to keep the endless drive member engaged with pulley segments of more than one set during the transition of the endless drive member from a disengaging pulley segment set (an "origin set") to an engaging pulley segment set (a "destination set").

Operation of the pulley transmission 20 will now be described with reference to FIGS. 1 to 4. During the phase of operation in which pulley transmission 20 is transmitting power at a constant ratio, the endless drive member engages one of the pulley segment sets, which set is spinning and acting like a normal pulley, or the core pulley, transmitting power between the pulley assembly and the cooperating pulley.

For purposes of this discussion, a currently disengaging pulley segment set will be termed the "origin set", while the pulley segment set to which the endless drive member is transitioning will be termed the "destination set". Where either of these terms refers to a smaller pulley segment set, they can also refer to the core pulley.

During operation, the pulley segments 48 of one or more of the pulley segment sets in the pulley assembly 36 may be in an engaging position. In this position, the outermost pulley segments engage the endless drive member 47 and collectively act like a pulley to transmit power. All pulley segments 48 are static in relation to the pulley assembly 36 while the pulley assembly 36 transmits power at a constant ratio. The pulley segments 48 of the pulley segment sets that are smaller than an entirely engaging pulley segment set do not contact the endless drive member 47 when in their engaging positions, as the endless drive member 47 engages only the outermost pulley segments 48. As a result, the axial position of the smaller pulley segment sets is not consequential. However, these pulley segments 48 may rest in the engaging position in preparation to engage the endless drive member 47 when the largest pulley segments 48 in an engaging position are retracted into a non-engaging position, thereby disengaging the endless drive member 47. The pulley segments 48 in the pulley segment sets that are larger than the currently engaging pulley segment set must be in their non-engaging positions so as not to come between the endless drive member 47 and the currently engaging pulley segments 48.

While all the pulley segments 48 in the largest pulley segment set engaging the endless member are in their engaging positions, they collectively act like a pulley, allowing the pulley assembly 36 to rotate and drive the cooperating pulley 76 via the endless drive member 47. Alternatively, the cooperating pulley 76 may drive the engaging pulley segment set and pulley assembly 36 via the endless drive member 47.

Figure 4:
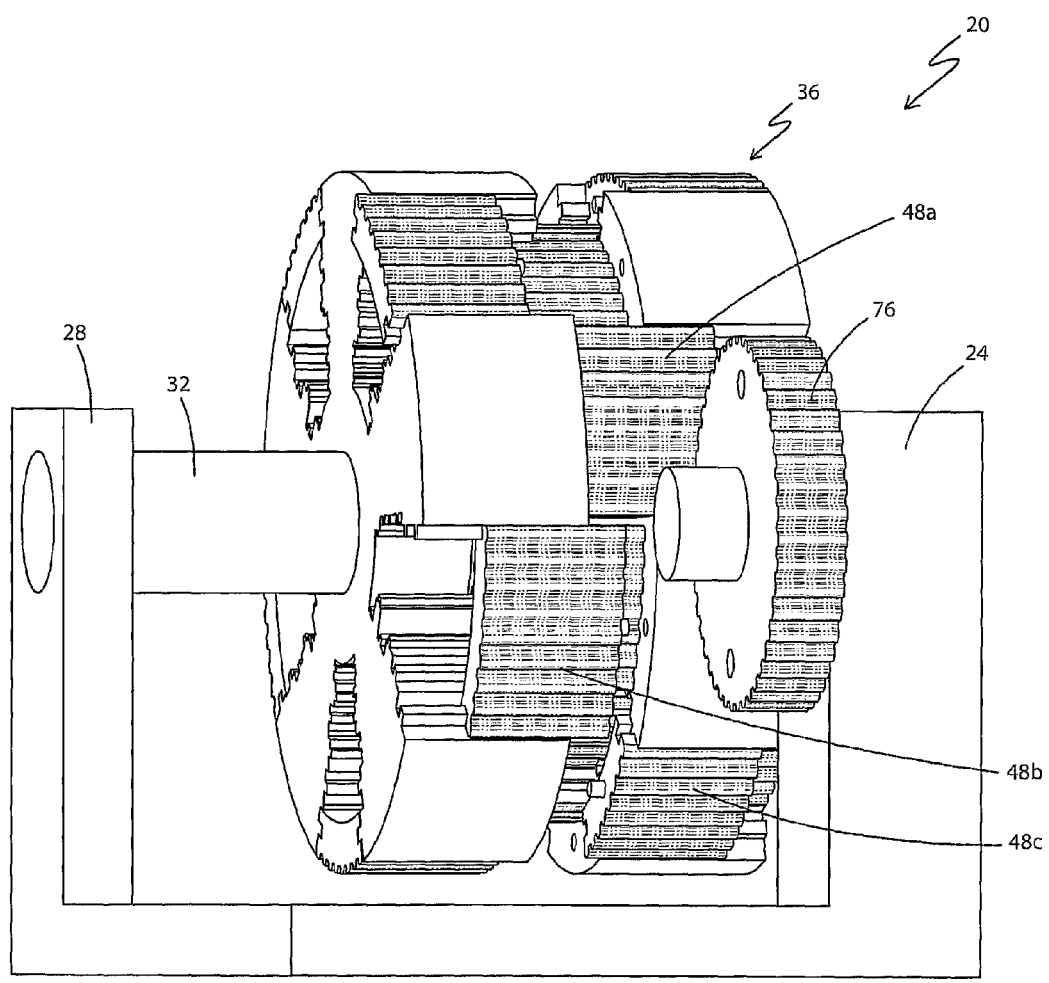
FIG. 4 shows a perspective side view of the engagement of a pulley segment set.

Transition from a Smaller Pulley Segment Set or the Core Pulley to a Larger Pulley Segment Set Referring now to FIGS. 3 and 4, transition from a smaller pulley segment set or the pulley core 45 to a large pulley segment set will be described. In a transition from a smaller pulley segment set or the core pulley to a larger pulley segment set, the origin set is a smaller pulley segment set that engages the endless drive member. As the pulley assembly 36 rotates, the desired transition is that the endless drive member 47 engages pulley segments in the larger destination set without disengaging from all of the pulley segments 48 or core pulley 45 in the origin set until the endless drive member 47 is entirely engaged by pulley segments 48 of the destination set.

In particular, FIG. 3 illustrates two pulley segment sets around the core pulley 45. Each of the pulley segment sets includes ten pulley segments 48. The pulley segment set immediately surrounding the core pulley 45 is shown having pulley segments 48a to 48j. The direction of rotation is shown as being clockwise.

Generally, most pulley segments 48 of a pulley segment set in an engaging position are in contact with the endless drive member. An angular area CZ is shown defining an angular contact zone between the endless drive member and the endless drive member for the first pulley segment set. As will be understood by those skilled in the art, the contact zone can vary between pulley segment sets. For larger pulley segment sets, the contact zone may increase in angular size.

Pulley segment 48a is a key pulley segment and is shown engaging the endless drive member.

In order to initiate transition of the endless drive member from the origin set to the destination set, one pulley segment in the destination set is moved to engage the endless drive member 47 first, moved by the actuator into the path of the endless drive member 47 when it is outside said angular contact zone. This pulley segment in the destination set is a key pulley segment in relation to the origin set. This pulley segment is key because the destination set and the origin set have been specifically aligned in their respective rotational angles around the axis such that the teeth of the endless drive member 47 can be properly engaged with the origin set and the teeth of this key pulley segment simultaneously without introducing significant slack or interference in the endless drive member 47. Thus when this key pulley segment is actuated and moved into the path of the endless drive member 47, where it may be engaged, the endless drive member 47 will engage it positively, even while force is being transmitted between the pulley assembly 36 and the cooperating pulley 76.

Once this key pulley segment moves into its engaging position, each following pulley segment in the same pulley segment set is subsequently moved into its engaging position as it passes outside of the angular contact zone. Thus the following pulley segments continue the engagement of the endless drive member with the destination set. The actuator 80 moves each individual pulley segment 48 at a speed sufficient for it to complete its movement between its engaging position and its non-engaging position, in either direction, during the period of time while they are outside the contact zone.

Once these pulley segments 48 have moved into their engaging position, the actuators 80 and design of the pulley assembly 36 keeps them in position.

Pulley segments 48 move between engaging and non-engaging positions while they are outside the angular contact zone. This rotational range, where the pulley segments move between engaging and non-engaging positions, is the range in which the pulley segments 48 never contact the endless drive member 47 in their operation as a pulley. When the last of the pulley segments 48 in the destination set has moved into its engaging position, all of the pulley segments 48 in the destination set collectively act as a pulley. The transition of the endless drive member 47 from the origin set to the destination set is then complete, and the pulley segments 48 in the destination set rest in their engaging positions.

The key pulley segment is actuated at the correct moment, and subsequently the following pulley segments 48 are actuated by the sequencer, which accepts an input signal from a system controller to transition the endless drive member 47 from the origin set to the destination set. The sequencer 88 actuates the key pulley segment via the corresponding actuator 80 at a precise moment via an input signal regarding the relative rotational angle, direction and speed of the pulley assembly 36 and the pulley segments 48 sensed by the sensor 84.

Transition from a Larger Pulley Segment Set to a Smaller Pulley Segment Set or the Core Pulley In a transition from a larger pulley segment set to a smaller pulley segment set or the core pulley 45, when the endless drive member 47 is engaged with a larger pulley segment set as the origin set, and the pulley assembly 36 is rotating, the desired transition is that the endless drive member 47 engage the smaller pulley segments 48 or core pulley in the destination set without disengaging from the pulley segments 48 in the origin set until the endless drive member 47 is engaged with pulley segments 48 of the destination set. For purposes of this discussion of a transition to a smaller pulley segment set, when reference is made to the "destination set", the destination set may also be the core pulley 45, because the action of transitioning the engagement of the endless drive member 47 from the origin set to the destination set is fundamentally the same as the action of transitioning its engagement from the origin set to the core pulley 45, the only difference being that the core pulley 45 is not itself comprised of pulley segments 48.

The transition of engagement of the endless drive member from a larger origin set to a smaller destination set, or to the core pulley 45, is similar in many respects to the transition of the endless drive member 47 from a smaller origin set, or the core pulley 45, to a larger destination set. However, instead of a key pulley segment initiating the sequence of pulley segments 48 moving into their engaging positions, a key pulley segment is the last pulley segment in the origin pulley segment set to contact the endless drive member 47, with subsequent pulley segments of the origin pulley segment set being retracted to permit the endless drive member 47 to engage the smaller destination pulley segment set.

The key pulley segment for transitioning from a larger origin set to a smaller destination set or core pulley 45 is specifically aligned in its respective rotational angle around the axis relative to the destination set such that the teeth of the endless drive member 47 can be simultaneously engaged with the teeth of the key pulley segment of the origin set and the teeth of subsequent pulley segment of the destination pulley set without introducing significant slack or interference in the endless drive member 47. Thus when pulley segments 48 of the origin set subsequent to the key pulley segment are actuated into a non-engaging position and moved out of the path of the endless drive member 47, the endless drive member 47 will engage the destination set positively, even while force is being transmitted between the pulley assembly 36 and the cooperating pulley 76. Once this key pulley segment moves out of the contact zone, it is retracted and the destination set is fully engaged by the endless drive member 47.

One application of the present invention is in vehicular transportation. The present invention may enhance the function of contemporary automatic and manual transmissions in automobiles, motorcycles, boats and heavy machinery and confer substantial efficiency and other benefits. In such applications, the segmented pulley transmission of the present invention, driven by the engine, could drive the wheels or propeller of a vehicle in cooperation with other standard drive train components. The segmented pulley transmission may be implemented with one set of pulley segments, actuators and a sequencer in the housing with a normal pulley as the cooperating pulley. Alternatively, two pulley assemblies, with pulley segment sets, actuators and a coordinated sequencer for each respective pulley assembly, implemented in a single housing. The latter implementation would be beneficial, since the ratio ranges offered by each pulley assembly set would combine to create a total range of ratios that is a multiple of the two pulley assembly ranges. For example, if each pulley assembly's largest pulley segment set has a circumference or number of teeth that is three times that of the pulley assembly's core pulley, then two pulley assemblies would combine to offer a range of ratios equivalent to one pulley assembly with an outer pulley segment set that has a circumference or number of teeth that is nine times that of the pulley assembly's core pulley. The sequencer is coupled to the sensor and to other systems.

A computerized controller external to the power transmission of the vehicle monitors the speed of the vehicle, the speed of the engine, the vehicle driver's input to the accelerator controller, and other data that could be utilized to determine the appropriate gear ratio changes needed for increased performance and/or efficiency. The sequencer, in turn, determines when to change from one pulley segment set to another. The sequencer sends an electronic signal back (if computerized), or sensors would yield data, to indicate to the controller when the gear change is initiated and completed, and to positively indicate which gear ratio the vehicle is currently enabling. The computerized controller may also control aspects of the engine function or other functions in the vehicle in coordination with the transmission. The sequencer would control the actuators, and, in a computerized version, signal high-speed motors (such as linear motors or solenoids, or electric controls of hydraulic or pneumatic or other actuator methods), with timing adjustments and compensations calculated and implemented, and would actuate the transmission of linear force onto the pulley segments so that the segments make their transition between the engaging position and non-engaging position, in either direction.

A key benefit of the present invention over contemporary vehicle transmissions is that, while itself being very efficient, the invention will allow a vehicle to have a number of gear ratios available in its power train without suffering large efficiency and acceleration penalties that the use of added ratios (within a given range) would impose on many other contemporary transmissions. Since no clutch is necessary for transitioning between pulley segment sets, there is no mandatory pause in the transmission of force while the transmission changes the rotary ratio presented to the engine or other such power source. Also, since there is little or no time or energy penalty in changing ratios, the range of ratios can be expanded, particularly toward the lower ratios presented to an engine in a vehicle. This would enhance acceleration, making smaller, efficient engines that are more suitable in a multitude of applications. It would also increase the acceleration capacity of performance-oriented vehicles as the inherent strength and positive engagement of the endless drive member is suitable for high torque-handling requirements.

While the present invention has been described with specificity to switching to the next larger or smaller gear, it can be made to accommodate switches to another gear that is not the next larger or smaller. In such cases, the same or different pulley segments can be designated as key pulley segments. For example, a pulley segment set can have one key pulley segment for each of the following circumstances: switch one gear larger, switch one gear smaller, switch two gears larger, switch two gears smaller.

The actuator may use various methods of exerting force to accomplish pulley segment movement, including but not limited to mechanical coupling, electromagnetic means (such as a solenoid or a linear or rotating motor), hydraulic means, pneumatic means and centrifugal means.

The receiving and coupling feature on the pulley assembly can also contain a feature to absorb energy such as a damper to decelerate the pulley segment as it comes to rest in its engaging position.

The endless drive member can be belt, a chain, or other generally flexible apparatus for engaging mating features of the pulley segments. The endless drive member can be customized or can be a standard part.

The pulley segment sets need not be arranged in a circular ring and can be arranged in other configurations. For example, the pulley segments of a set can be arranged in an ovoid or ellipse ring. Other forms will occur to those skilled in the art.

The core pulley can be provided by a pulley segment set.

Although the foregoing description relates to a specific preferred embodiment as presently contemplated by the inventors, it will be understood by those skilled in the art that the invention in its broad aspect includes mechanical and functional equivalents of the elements described herein.

It will be apparent that the scope of the present invention is limited only by the claims set out hereinbelow.

What is claimed is:

1. A segmented pulley transmission, comprising:
a pulley assembly mounted on an axle, said pulley assembly including a core pulley having a first set of mating features on a peripheral surface thereof, said pulley assembly also including a first carousel and a second carousel separated by said core pulley; and
a pulley segment set comprising a first pulley segment subset slidably mounted in said first carousel and a second pulley segment subset slidably mounted in said second carousel, said first and second pulley segment subsets being arranged in a ring concentric with said core pulley, said pulley segments of said first pulley segment subset being actuatable out of said first carousel and towards said second carousel, said pulley segments of said second pulley segment subset being actuatable out of said second carousel and towards said first carousel, said pulley segments of said first and second pulley segment subsets being positioned alternatingly to interleave and provide a resultant pulley larger than said core pulley when actuated out of the respective first and second carousels.

2. A segmented pulley transmission, comprising:
a pulley assembly mounted on an axle, said pulley assembly including a core pulley having mating features on a peripheral surface thereof;
an endless drive member;
a plurality of pulley segment sets arranged in concentric rings, each pulley segment set comprising a plurality of pulley segments, one pulley segment of each pulley segment set being designated as a key pulley segment, each pulley segment being axially slidable between a non-engaging position where said pulley segment is positioned away from said endless drive member and an engaging position where said pulley segment is positioned in the path of said endless drive member, each pulley segment having mating features on a peripheral surface thereof matching the mating features of said core pulley;
said endless drive member having corresponding mating features on an inside surface thereof for engaging mating features of said core pulley and/or mating features of the pulley segments of a pulley segment set when the pulley segments thereof are in said engaging position; and an actuator for actuating the pulley segments of a selected pulley segment set thereby to slide said pulley segments thereof axially between said engaging and non-engaging positions when said pulley segments are at positions where they are unable to contact said endless drive member, wherein said actuator is operable to actuate the pulley segments of the selected pulley segment set to transition the endless drive member either from the core pulley to a pulley segment set, from a pulley segment set to the core pulley or between pulley segment sets, and wherein during transition of said endless drive member from a chosen one of the core pulley and a smaller pulley segment set that is positioned in the path of said endless drive member, the chosen core pulley or smaller pulley segment set being referred to as the smaller-to-larger origin set, to a chosen larger pulley segment set that is positioned away from said endless drive member, the chosen larger pulley segment set being referred to as the smaller-to-larger destination set, the key pulley segment of the larger diameter pulley segment set is moved axially by said actuator from said non-engaging position to said engaging position first so that mating formations of the endless drive member simultaneously engage mating formations of pulley segments of said smaller-to-larger origin set and mating formations of the key pulley segment of said smaller-to-larger destination set without introducing slack to said endless drive member, followed by the remainder of the pulley segments of the larger diameter pulley set and wherein during transition of said endless drive member from a chosen larger diameter pulley segment set, the chosen larger diameter pulley segment set being referred to as the larger-to-smaller origin set that is concentric with said core pulley to a chosen one of the core pulley and a smaller diameter pulley segment set that is also concentric with the core pulley, the chosen core pulley or smaller diameter pulley segment set being referred to as the larger-to-smaller destination set, the pulley segments of the larger diameter pulley segment set are moved axially by said actuator from said engaging position to said non-engaging position with the key pulley segment of the larger diameter pulley set being moved to said non-engaging position last, so that mating formations of said endless drive member simultaneously engage mating formations of the key pulley segment of said larger-to-smaller origin set and mating formations of said larger-to-smaller destination set without introducing slack to said endless drive member.

3. A pulley transmission according to claim 2 wherein said pulley assembly comprises a first carousel and a second carousel separated by said core pulley and spaced from one another to provide a channel through which said endless drive member travels, each of said pulley segment sets comprising two pulley segment subsets, one pulley segment subset mounted in said first carousel and the other pulley segment subset mounted in said second carousel, the pulley segments of said one pulley segment subset being moveable by said actuator towards and away from said second carousel, and the pulley segments of said other pulley segment subset being moveable by said actuator towards and away from said first carousel, said pulley segments of said two pulley segment subsets being alternatingly angularly offset such that they interleave when urged towards each other.

4. A segmented pulley transmission according to claim 2, further comprising:
a sequencer to control the actuation of the pulley segments of said selected pulley segment set between engaging and non-engaging positions.

5. A pulley transmission according to claim 3 wherein each of the pulley segments has a stud thereon, the studs on the pulley segments mounted in the first carousel being dimensioned to be received in corresponding apertures in the second carousel and the studs on the pulley segments mounted in the second carousel being dimensioned to be received in corresponding apertures in the first carousel.

6. A segmented pulley transmission, comprising:
a pulley assembly mounted on a rotatable axle, said pulley assembly including a core pulley having a first set of mating features on a peripheral surface thereof;

an endless drive member;

a plurality of pulley segment sets arranged in concentric rings, each pulley segment set comprising a plurality of pulley segments, one pulley segment of each pulley segment set being designated as a key pulley segment, each pulley segment being axially slidable between a non-engaging position where said pulley segment is positioned away from said endless drive member and an engaging position where said pulley segment is positioned in the path of said endless drive member, each pulley segment having a second set of mating features on a peripheral surface thereof matching said first set of mating features;

said endless drive member having corresponding mating features on an inside surface thereof for engaging the first set of mating features of said core pulley and/or the second set of mating features of said pulley segments of a pulley segment set when the pulley segments are in said engaging position, wherein contact between said endless drive member and said core pulley defines a contact zone; and an actuator for actuating said pulley segments thereby to slide said pulley segments between said engaging and non-engaging positions when said pulley segments are at positions outside of said contact zone, wherein said actuator is operable to actuate the pulley segments of a pulley segment set to transition the endless drive member either from the core pulley to a pulley segment set, from a pulley segment set to the core pulley or between pulley segment sets without introducing interference or slack to said endless drive member, and wherein during the transition of said endless drive member from a chosen one of the core pulley and a smaller pulley segment set that is positioned in the path of said endless drive member, the chosen core pulley or smaller pulley segment set being referred to as the smaller-to-larger origin set, to a chosen larger pulley segment set that is positioned away from said endless drive member, the chosen larger pulley segment set being referred to as the smaller-to-larger destination set, the key pulley segment of the larger diameter pulley segment set is moved by said actuator from said non-engaging position to said engaging position first so that mating formations of the endless drive member simultaneously engage mating formations of pulley segments of said smaller-to-larger origin set and mating formations of the key pulley segment of said smaller-to-larger destination set, followed by the remainder of the pulley segments of the larger diameter pulley set and wherein during the transition of said endless drive member from a chosen larger diameter pulley segment set, the chosen larger diameter pulley segment set being referred to as the larger-to-smaller origin set, that is concentric with said core pulley to a chosen one of the core pulley and a smaller diameter pulley segment set that is also concentric with the core pulley, the chosen core pulley or smaller diameter pulley segment set being referred to as the larger-to-smaller destination set; the pulley segments of the larger diameter pulley segment set are moved by said actuator from said engaging position to said non-engaging position with the key pulley segment of the larger diameter pulley set being moved to said non-engaging position last, so that mating features of said endless drive member simultaneously engage mating formations of the key pulley segment of said larger-to-smaller origin set and mating formations of said larger-to-smaller destination set.

7. A pulley transmission according to claim 6 wherein said pulley assembly comprises a first carousel and a second carousel separated by said core pulley and spaced from one another to provide a channel through which said endless drive member travels, each of said pulley segment sets comprising two pulley segment subsets, one pulley segment subset mounted in said first carousel and the other pulley segment subset mounted in said second carousel, the pulley segments of said one pulley segment subset being moveable by said actuator towards and away from said second carousel, and the pulley segments of said other pulley segment subset being moveable by said actuator towards and away from said first carousel, said pulley segments of said two pulley segment subsets being alternatingly angularly offset such that they interleave when urged towards each other.

8. A segmented pulley transmission according to claim 6, further comprising:
a sequencer to control the actuation of the pulley segments of said selected pulley segment set between engaging and non-engaging positions.

9. A pulley transmission according to claim 7 wherein each of the pulley segments has a stud thereon, the studs on the pulley segments mounted in the first carousel being dimensioned to be received in corresponding apertures in the second carousel and the studs on the pulley segments mounted in the second carousel being dimensioned to be received in corresponding apertures in the first carousel.

10. A pulley transmission according to claim 6 wherein said axle is rotatably mounted on a pair of support brackets.

11. A pulley transmission according to claim 8 further comprising a sensor operable to detect the rotational position, direction and speed of said pulley assembly.

12. A pulley transmission according to claim 11 wherein said sensor transmits position and speed information to said sequencer.

13. A pulley transmission according to claim 6 further comprising an idler pulley and tensioner to tension said endless drive member.

14. A pulley transmission according to claim 6 wherein said endless drive member is a belt or chain.

15. A pulley transmission according to claim 6 wherein said actuator employs one of mechanical means, electromagnetic means, hydraulic means and pneumatic means to slide said pulley segments axially.

16. A segmented pulley transmission, comprising:
a pulley assembly mounted on a rotatable axle, said pulley assembly including a core pulley having a first set of mating features on a peripheral surface thereof;
an endless drive member;
a plurality of pulley segment sets arranged in concentric rings, each pulley segment set comprising a plurality of pulley segments, one pulley segment of each pulley segment set being designated as a key pulley segment, each pulley segment being individually actuable out of a respective pulley segment set to an engaging position where said pulley segment is aligned with the path of said endless drive member and into a respective pulley segment set to a non-engaging position where said pulley segment is positioned away from the path of said endless drive member, each pulley segment having a second set of mating features on a peripheral surface thereof matching said first set of mating features;
said endless drive member having corresponding mating features on an inside surface thereof for engaging either the first set of mating features of said core pulley or the second set of mating features of said pulley segments when the pulley segments are in said engaging position, wherein contact between said endless drive member and said core pulley or pulley segments defines a contact zone; and
an actuator for actuating said pulley segments between said engaging and non-engaging positions when said pulley segments are outside of said contact zone,
wherein during transition of said endless drive member from a chosen one of the core pulley and a smaller diameter pulley segment set, the chosen core pulley or smaller diameter pulley segment set being referred to as the smaller-to-larger origin pulley segment set, to a chosen larger diameter pulley segment set having pulley segments that are positioned away from said endless drive member, the chosen larger diameter pulley segment set being referred to as the smaller-to-larger destination pulley segment set, the key pulley segment of the larger diameter pulley segment set is moved from said non-engaging position to said engaging position first by said actuator when the key pulley segment of the larger diameter pulley segment set is outside of said contact zone, and then each following pulley segment of the larger diameter pulley set is subsequently moved by said actuator into an engaging position as each following pulley segment of the larger diameter pulley set passes outside of the contact zone and wherein during transition of said endless drive member from a chosen larger diameter pulley segment set, the chosen larger diameter pulley segment set being referred to as the larger-to-smaller origin set, to a chosen one of the core pulley and a smaller diameter pulley segment set, the chosen core pulley or smaller diameter pulley segment set being referred to as the larger-to-smaller destination set, the pulley segments of the larger diameter pulley segment set are moved in sequence from said engaging position to said non-engaging position with the key pulley segment of the larger diameter pulley set being moved to said non-engaging position last, so that during said transition said endless drive member simultaneously engages the key pulley segment of said larger-to-smaller origin set and an adjacent pulley segment of said larger-to-smaller destination set, and
wherein when a key pulley segment is moved into said engaging position the position of the key pulley segment allows the key pulley segment to engage the endless drive member while the endless drive member is still engaging a chosen one of the smaller-to-larger origin pulley segment set or the larger-to-smaller origin set, said choice being made responsive to the transition being in a smaller-to larger or larger-to-smaller direction, and wherein the distance between the second set of mating features of said key pulley segment and adjacent mating features of the respective smaller-to-larger origin pulley segment set or larger-to-smaller origin set as spanned by said endless drive member is generally equal to a multiple of the pitch of the mating features of the said endless drive member so as not to introduce slack or interference in said endless drive member.

17. A pulley transmission according to claim 16 wherein said pulley assembly comprises a first carousel and a second carousel separated by said core pulley and spaced from one another to provide a channel through which said endless drive member travels, each of said pulley segment sets comprising two pulley segment subsets, one pulley segment subset mounted in said first carousel and the other pulley segment subset mounted in said second carousel, the pulley segments of said one pulley segment subset being moveable by said actuator towards and away from said second carousel, and the pulley segments of said other pulley segment subset being moveable by said actuator towards and away from said first carousel, said pulley segments of said two pulley segment subsets being alternatingly angularly offset such that they interleave when urged towards each other.

18. A segmented pulley transmission according to claim 16, further comprising:
a sequencer to control the actuation of the pulley segments of said selected pulley segment set between engaging and non-engaging positions.

19. A pulley transmission according to claim 17 wherein each of the pulley segments has a stud thereon, the studs on the pulley segments mounted in the first carousel being dimensioned to be received in corresponding apertures in the second carousel and the studs on the pulley segments mounted in the second carousel being dimensioned to be received in corresponding apertures in the first carousel.

20. A pulley transmission according to claim 16 wherein said axle is rotatably mounted on a pair of support brackets.

21. A pulley transmission according to claim 18 further comprising a sensor operable to detect the rotational position, direction and speed of said pulley assembly.

22. A pulley transmission according to claim 21 wherein said sensor transmits position and speed information to said sequencer.

23. A pulley transmission according to claim 16 further comprising an idler pulley and tensioner to tension said endless drive member.

24. A pulley transmission according to claim 16 wherein said endless drive member is a belt or chain.

25. A pulley transmission according to claim 16 wherein said actuator employs one of mechanical means, electromagnetic means, hydraulic means and pneumatic means to slide said pulley segments axially.

26. A segmented pulley transmission, comprising:
a pulley assembly mounted on an axle, said pulley assembly including a core pulley having mating features on a peripheral surface thereof;
an endless drive member;
a plurality of pulley segment sets arranged in concentric rings, each pulley segment set comprising a plurality of pulley segments, some of the pulley segments of each pulley segment set being accommodated by a first carousel on one side of said core pulley and the remaining pulley segments of each pulley segment set being accommodated by a second carousel on the opposite side of said core pulley, one pulley segment of each pulley segment set being designated as a key pulley segment, each pulley segment being slidable between a non-engaging position where said pulley segment is positioned away from said endless drive member and an engaging position where said pulley segment is positioned in the path of said endless drive member, each pulley segment having mating features on a peripheral surface thereof matching the mating features of said core pulley;
said endless drive member having corresponding mating features on an inside surface thereof for engaging mating features of said core pulley and/or mating features of the pulley segments of a pulley segment set when the pulley segments thereof are in said engaging position; and
an actuator for actuating the pulley segments of a selected pulley segment set thereby to slide said pulley segments thereof between said engaging and non-engaging positions when said pulley segments are at positions where they are unable to contact said endless drive member,
wherein said actuator is operable to actuate the pulley segments of the selected pulley segment set to transition the endless drive member either from the core pulley to a pulley segment set, from a pulley segment set to the core pulley or between pulley segment sets, and
wherein during transition of said endless drive member from a chosen one of the core pulley and a smaller pulley segment set that is positioned in the path of said endless drive member, the chosen core pulley or smaller pulley segment set being referred to as the smaller-to-larger origin set, to a chosen larger pulley segment set that is positioned away from said endless drive member, the chosen larger pulley segment set being referred to as the smaller-to-larger destination set, the key pulley segment of the destination set is moved axially by said actuator from said
non-engaging position to said engaging position first so that mating formations of the endless drive member simultaneously engage mating formations of pulley segments of said smaller-to-larger origin set and mating formations of the key pulley segment of said smaller-to-larger destination set without introducing slack to said endless drive member, followed by the remainder of the pulley segments of the smaller-to-larger destination set and wherein during transition of said endless drive member from a chosen larger diameter pulley segment set, the chosen larger diameter pulley segment set being referred to as the larger-to-smaller origin set, that is concentric with said core pulley to a chosen one of the core pulley and a smaller diameter pulley segment set that is also concentric with the core pulley, the chosen core pulley or smaller diameter pulley segment set being referred to as the larger-to-smaller destination set, the pulley segments of the larger-to-smaller origin set are moved axially by said actuator from said engaging position to said non-engaging position with the key pulley segment of the larger-to-smaller origin set being moved to said non-engaging position last, so that mating formations of said endless drive member simultaneously engage mating formations of the key pulley segment of said larger-to-smaller origin set and mating formations of said larger-to-smaller destination set without introducing slack to said endless drive member.

27. A segmented pulley transmission according to claim 1 further comprising an actuator for actuating pulley segments of said pulley segment set.

28. A pulley transmission, comprising:
a pulley assembly mounted on an axle, said pulley assembly comprising a core pulley, first and second carousels positioned on opposite sides of and separated by said core pulley and a pulley segment set comprising a first pulley segment subset supported by said first carousel and a second pulley segment subset supported by said second carousel, pulley segments of said first pulley segment subset being slidable from a non-engaging condition towards said second carousel to an engaging condition and pulley segments of said second pulley segment subset being slidable from a non-engaging condition towards said first carousel to an engaging condition, the pulley segments of said first and second pulley segment subsets being arranged so as to interleave and form a resultant pulley that is larger than said core pulley when in said engaging conditions.

29. A pulley transmission according to claim 28 further comprising an actuator to slide said pulley segments between said non-engaging and engaging conditions.

30. A pulley transmission according to claim 29 further comprising:
a sequencer communicating with said actuator to control the actuation of said pulley segments between said non-engaging and engaging conditions.

31. A pulley transmission according to claim 28 wherein said axle is rotatably mounted on a pair of support brackets.

32. A pulley transmission according to claim 28 wherein the pulley segments of each pulley segment subset have a stud thereon, the studs on the pulley segments supported by the first carousel being dimensioned to be received in corresponding apertures in the second carousel when the pulley segments are in said engaging condition and the studs on the pulley segments supported by the second carousel being dimensioned to be received in corresponding apertures in the first carousel when the pulley segments are in said engaging condition.

33. A pulley transmission according to claim 30 further comprising a sensor operable to detect the rotational position, direction and speed of said pulley assembly.

34. A pulley transmission according to claim 33 wherein said sensor transmits position and speed information to said sequencer.

35. A pulley transmission according to claim 28 wherein said core pulley comprises a pulley segment set.

36. A pulley transmission according to claim 29 wherein said actuator employs one of mechanical means, electromagnetic means, hydraulic means and pneumatic means to slide axially said pulley segments.

37. A pulley transmission according to claim 28 further comprising an endless drive member wound about either said core pulley or said resultant pulley.

38. A pulley transmission according to claim 37 further comprising an idler pulley and tensioner to tension said endless drive member.

39. A pulley transmission according to claim 37 wherein said endless drive member is a belt or chain.

* * * * *